Patented Feb. 23, 1926.

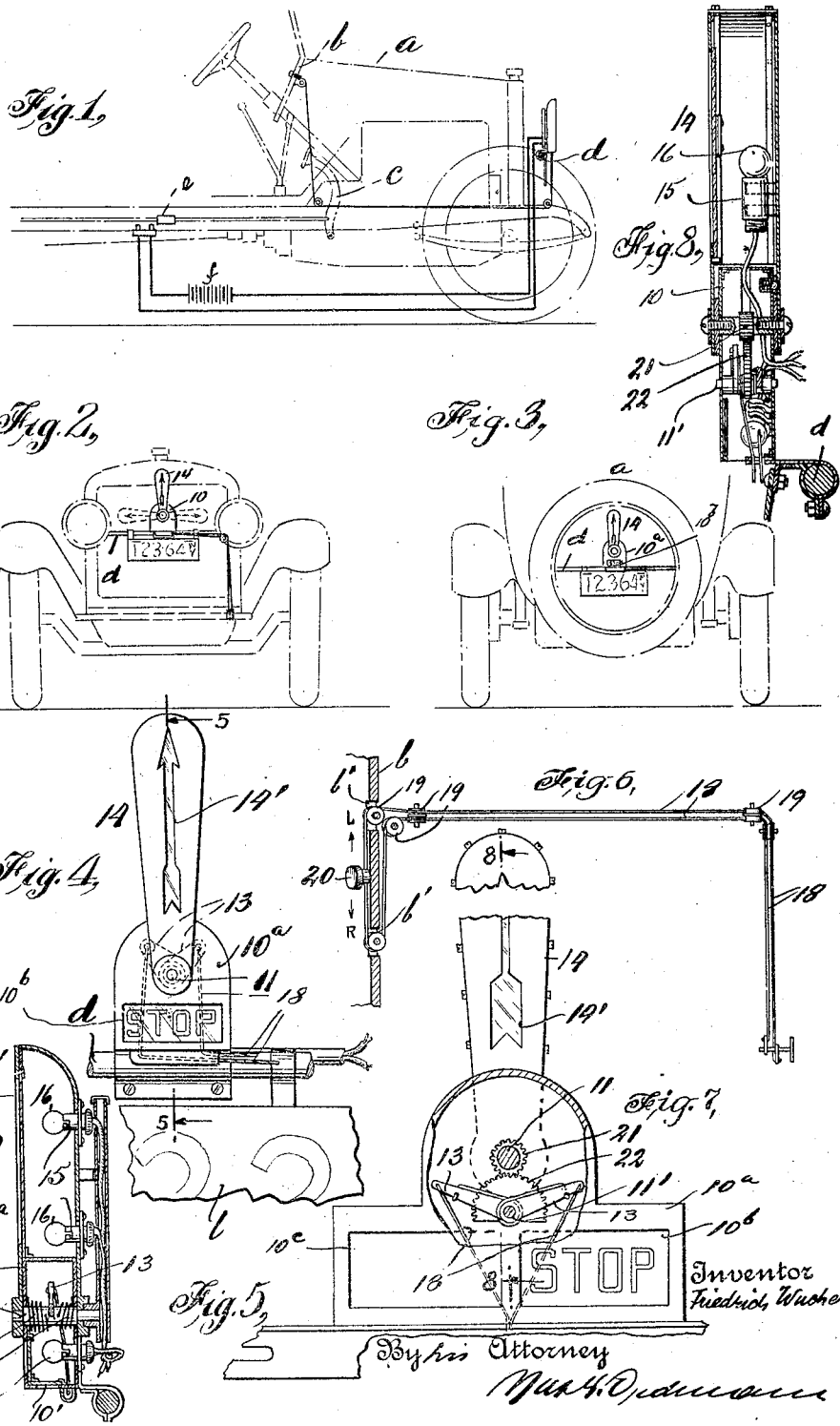

1,574,463

UNITED STATES PATENT OFFICE.

FRIEDRICH WUCHERT, OF ASTORIA, NEW YORK.

AUTOMOBILE SIGNAL.

Application filed August 12, 1924. Serial No. 731,575.

*To all whom it may concern:*

Be it known that I, FRIEDRICH WUCHERT, a citizen of Germany, residing at Astoria, Long Island, in the county of Queens and State of New York, have invented certain new and useful Improvements in Automobile Signals, of which the following is a specification.

This invention relates to signaling devices for motor vehicles or the like and particularly a signaling device designed to show the direction in which the vehicle is about to turn.

One object of this invention is to provide an improved construction of a signaling device having semaphore arms, one for the front and one for the rear, which can be easily and simultaneously manipulated from the driver's seat.

A second object of this invention is to form such semaphore arms with illuminating means, so that they will be visible in the night.

A further object of this invention is to construct the rear signaling device so as to incorporate in one body, a direction signal, stop signal and the rear light.

With these and other objects in view, my invention consists in the construction, combination and arrangement of parts, as will be hereinafter fully described and defined in the appended claims.

In the accompanying drawing in which similar reference characters denote corresponding parts, Fig. 1 is a diagrammatic side elevation of a motor vehicle equipped with my device; Fig. 2 is a front elevation thereof; Fig. 3 is a rear elevation thereof; Fig. 4 is a front elevation of the rear semaphore arm; Fig. 5 is a vertical section on line 5—5 of Fig. 4; Fig. 6 is a horizontal section through the dash board showing the means for the manipulation of the semaphore arms; Fig. 7 is a front elevation of a modified rear signaling device and Fig. 8 is a vertical section thereof.

*a* denotes a motor vehicle, *b* the dash board, *c* the brake pedal. In the center of the front and of the rear of the vehicle on stationary parts such as bars *d* are fixed the two signaling devices constituting the subject of this invention. The two signaling devices are identical in construction, except that the one for the rear may be modified to incorporate in itself also the rear lamp and the stop signal.

Each of these devices comprises a casing or box shaped support 10, which by suitable means is adapted to be fixed to its corresponding stationary part. Rotatively borne in the front and rear walls of said casing is a horizontal cross pin or spindle 11 on which are mounted two coil springs 12 wound in opposite directions. The inner ends of these coils are fixed to the spindle or pin 11 and the outer ends thereof are fixed to the adjacent walls of said casing. According to the construction shown in Figs. 4 and 5, there are two crank arms 13 fixed to said spindle to extend at an angle relative to one another and to be uniformly inclined relative to the vertical axial plane when in normal position. The ends of the spindle 11 project outwardly from the casing and have suitably fixed to them a semaphore arm 14. This semaphore arm is in form of a hollow casing substantially of the shape shown, in the outer face of which I provide a longitudinally extending arrow shaped slit 14' the head of which is directed outwardly. Suitably fixed in said hollow arm or casing 14 are supports or sockets 15 for illuminating means, such as electric bulbs 16.

The casing 10 carrying the semaphore arm may also have illuminating means 17 and may be formed at its bottom with a recess or window opening 10' through which the light will fall onto the license plate 1, that may be attached directly below said opening.

The means for manipulating said two semaphore arms may comprise wires 18 or other flexible means guided over rollers 19 and passed through openings *b'* in the dash board *b*, where they may be attached to a button or grasp 20 to be within easy reach, from the driver's seat. The front and rear semaphore arms may be connected to the same grasp 20 to be operable simultaneously and in the same direction.

According to the modification shown in Figs. 7 and 8, the transmission of oscillatory movement to the arms 14 may be effected through gears. To this end, the spindle 11 supporting the semaphore arm carries a pinion 21 and the crank arms 13 are fixed to a separate parallel spindle 11' carrying a toothed sector 22 and borne in the casing 10ª, the sector 22 being in mesh with said pinion.

The casing 10ª supporting the rear signaling device may be formed with a window opening 10ᵇ in its outer face to serve as a stop signal. Or according to the modification shown in Figs. 7 and 8, the casing 10ª for the rear signaling device may be formed in one body with the stop signal and rear light. To this end, it may be divided into two compartments, each having illuminating means and a window opening 10ᵇ, 10ᶜ in its outer face, one to serve as stop signal and the other as rear light. The stop signal is in well known manner operated by the manipulation of the brake pedal c through a switch e controlling the circuit of the battery f.

Instead of illuminating the semaphore arm by electric bulbs, it may be in form of a solid bar with an arrow mark thereon treated with a fluorescent or other self-luminous substance. In use, as will be understood from the foregoing, according to the direction the car is to turn, the driver will shift the knob or grasp 20, thereby pulling the semaphore arms in front and in the rear to the corresponding direction.

What I claim is:—

1. As an article of manufacture, a signaling device for a motor vehicle, consisting of an illuminable casing having a bottom window and adapted to be fixed to the vehicle above the license plate, a spring actuated spindle extending transversely through and journalled in said casing, an illuminable semaphore arm fixed to said spindle and adapted normally to project in vertical direction, a pair of levers operatively connected to said spindle at an angle to each other, a manually operable member adapted to be supported at the dashboard of the vehicle and flexible means connecting said member to said levers, so that by the operation of said member the semaphore arm will be tilted from its vertical position to indicate the direction in which the vehicle is to turn.

2. In a motor vehicle signaling devices, one at the front and the other at the rear of the vehicle, each signaling device consisting of an illuminable casing having a bottom window and adapted to be fixed to the vehicle above the license plate, a spring actuated spindle extending transversely through and journalled in said casing, an illuminable semaphore arm fixed on said spindle and adapted to normally project in vertical direction, a pair of lever arms operatively connected to said spindle, a manually operable grasp supported at the dashboard of the vehicle and flexible means operatively connecting said member to both said lever arms, so that by the movement of said grasp both said lever arms will be titled simultaneously to indicate the direction in which the vehicle is to turn.

3. In a motor vehicle, a signaling device consisting of an illuminable casing formed with a window in its bottom and adapted to be fixed to the vehicle above the license plate, a spring actuated spindle extending transversely through and journalled in said casing, an illuminable semaphore arm fixed on said spindle and adapted normally to project in vertical direction, a pinion on said spindle, a second spindle journalled in said casing, a pair of lever arms fixed to said second spindle at an angle to each other, a toothed sector on said second spindle and adapted to mesh with said pinion, a manually operable grasp slidably supported at the dashboard of the vehicle and flexible means connecting said grasp to said levers, so that on the displacement of said grasp, both said lever arms will be simultaneously tilted to indicate the direction in which the vehicle is to turn.

In testimony whereof I affix my signature.

FRIEDRICH WUCHERT.